United States Patent [19]

Tannenbaum

[11] Patent Number: 5,240,775

[45] Date of Patent: * Aug. 31, 1993

[54] NON-STICK COATING SYSTEM WITH PTFE-PFA FOR CONCENTRATION GRADIENT

[75] Inventor: Harvey P. Tannenbaum, Philadelphia, Pa.

[73] Assignee: E. I. Du Pont de Nemours and Company, Wilmington, Del.

[*] Notice: The portion of the term of this patent subsequent to Jan. 7, 2009 has been disclaimed.

[21] Appl. No.: 762,068

[22] Filed: Sep. 23, 1991

[51] Int. Cl.$^5$ ........................ B32B 27/08; B32B 15/08
[52] U.S. Cl. .................... 428/422; 427/385.5; 428/458; 428/463
[58] Field of Search ............ 428/421, 422, 450, 463, 428/458; 427/385.5

[56] References Cited

U.S. PATENT DOCUMENTS

| | | | |
|---|---|---|---|
| 3,857,852 | 12/1974 | Tiesgen | 523/346 |
| 3,928,675 | 12/1975 | Tiesgen | 427/257 |
| 4,049,863 | 9/1977 | Vassiliou | 428/422 |
| 4,070,525 | 1/1978 | Vassiliou et al. | 428/422 |
| 4,087,394 | 5/1978 | Concannon | 524/514 |
| 4,118,537 | 10/1978 | Vary et al. | 428/421 X |
| 4,123,401 | 10/1978 | Berghmans et al. | 428/463 |
| 4,131,711 | 12/1978 | Attwood | 524/520 |
| 4,167,605 | 9/1979 | Attwood et al. | 428/419 |
| 4,252,859 | 2/1981 | Concannon et al. | 428/422 |
| 4,287,112 | 9/1981 | Berghmans | 524/441 |
| 4,311,755 | 1/1982 | Rummel | 428/312.6 |
| 4,351,883 | 9/1982 | Marcantonio et al. | 428/450 |
| 4,396,658 | 8/1983 | Mettes et al. | 428/36 |
| 4,425,448 | 1/1984 | Concannon et al. | 524/546 |
| 4,546,141 | 10/1985 | Gebauer | 524/508 |
| 4,548,986 | 10/1985 | Suzuki et al. | 528/66 |
| 5,049,437 | 9/1991 | Tannenbaum | 428/331 |
| 5,071,695 | 12/1991 | Tannenbaum | 428/422 |
| 5,079,073 | 1/1992 | Tannenbaum | 428/422 X |

FOREIGN PATENT DOCUMENTS

| | | | |
|---|---|---|---|
| 0056280 | 7/1982 | European Pat. Off. | |
| 0100889 | 2/1984 | European Pat. Off. | |
| 0389966 | 10/1990 | European Pat. Off. | |
| 1018269 | 1/1966 | United Kingdom | 524/520 |

Primary Examiner—Thomas J. Herbert, Jr.
Attorney, Agent, or Firm—Richard H. Burgess

[57] ABSTRACT

Improved non-stick coating systems can be applied to untreated smooth substrate with a primer of polytetrafluoroethylene and a perfluorinated copolymer of tetrafluoroethylene and perfluoro vinyl ether to give a concentration gradient.

10 Claims, No Drawings

NON-STICK COATING SYSTEM WITH PTFE-PFA FOR CONCENTRATION GRADIENT

BACKGROUND OF THE INVENTION

This invention relates to coatings systems, such as for cookware, which minimize sticking. More particularly, it relates to multilayer coating systems that can be used directly on smooth, untreated substrates and which provide concentration gradients within the coating.

Generally in the art a metal or glass substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrates is exacerbated by the nature of the coatings. If the coating is optimized for release to prevent food particles from sticking to it, for easy clean-up after cooking or durability, or to facilitate low friction sliding contact, almost by definition there will be difficulties in making it adhere well to the substrate.

The substrate can be metal, often aluminum or stainless steel used for cookware or industrial applications. It can be glass or ceramic. It might even be plastic for microwave oven cookware, or it could be an industrial article such as a saw made of carbon steel. Whatever the substrate or the application, if it is necessary to roughen the substrate to make the coating adhere, that at least adds cost and can cause other difficulties including creating a rough profile which can protrude or telegraph through the coating. This is especially undesirable when smoothness is sought, such as for saws, steam irons and copier rolls. The environmental cost of disposing of etchant materials can be significant. Sometimes, especially for glass and ceramic substrates, it also can casue unacceptable weakness or brittleness of the substrate.

Means of enhancing adhesion of non-stick coatings to a substrate are illustrated by the following patents.

U.S. Pat. No. 4,049,863—Vassiliou (1977) teaches a primer containing fluoropolymer, such as polytetrafluoroethylene (PTFE), colloidal silica and a polyamide imide (PAI), along with other constituents, applied by various techniques to a substrate that is preferably pretreated by grit blasting, flame spraying of metals or metal oxides or frit coating, or to phosphated and chromated metals. The PTFE:PAI ratio can be 1:9. The primer coat is ordinarily applied to a dry film thickness (DFT) of about 2-15 microns ($\mu$m). After air drying, the primer is topcoated with a conventional fluoropolymer enamel and baked. (Parts, percentages and proportions herein are by weight except where indicated otherwise.)

U.S. Pat. No. 4,087,394—Concannon (1987) discloses aqueous concentration gradient coatings of fluoropolymer which is 20-80% of a homopolymer of PTFE or a copolymer of fluorinated ethylene-propylene (FEP) made of 5-100% tetrafluoroethylene (TFE) with 95-0% hexafluoropropylene (HFP), with 80-20% of a film forming polymer which can be PAI. The coating is applied by spraying onto aluminum sheet, or a variety of substrates. Other application techniques are mentioned. Nothing is said about substrate preparation. Although PTFE and FEP are treated as a continuum, there are no suggestions to use a blend such as 50% PTFE, 50% FEP.

Representative of nonaqueous perfluoropolymer concentration gradient patents are U.S. Pat. Nos. 3,661,831 (1972) and 4,143,204 (1979) on FEP (preferably 3-20% HFP, balance TFE) with various film formers including PAI. At the end of each specification, example 24 teaches using such a coating as a primer under an ordinary PTFE topcoat on a frypan. U.K. 1,230,339 (1971) claims articles coated with nonaqueous PTFE-PAI with a concentration gradient. This and equivalent Canadian 887,122—Fang (1971) provide a single coating of PAI and PTFE on metal substrate with a concentration gradient from mostly PAI at the substrate to mostly PTFE at the air interface. This is applied as a single coat without any special primer on ordinary steel or sand-blasted aluminum.

A mixture of FEP and PTFE in an organic dispersion is in U.S. Pat. No. 3,904,575 (1975)—Satokawa. This says that lower molecular weight PTFE permits more FEP to be included in a stable dispersion. The use of PAI and other film formers is also disclosed. The examples teach sand blasting an aluminum substrate before applying the coating.

Also, U.K. 1,454,255—Berghmans and Seymus (1976) discloses aqueous dispersion coatings of mixtures of PTFE and FEP with $SiO_2$ and aluminum phosphate applied preferably to grit-blasted or frit-coated aluminum, but also specifically to untreated aluminum.

U.S. Pat. No. 4,287,112—Berghmans (1981) discloses PPS with PTFE, FEP and/or a copolymer of tetrafluoroethylene and hydrocarbon ether monomer which have been completely substituted with fluorine atoms as described in U.S. Pat. Nos. 4,292,859 (1981) and 4,351,883 (1982)—both Concannon, known as PFA, along with Al flake and $TiO_2$ pigment, in both aqueous and non-aqueous coatings. The preferred PTFE is irradiated micropowder. PTFE micropowder may be made according to the teaching of U.S. Pat. Nos. 3,116,226—Bowers (1963), 4,029,890—Brown et al (1977) or 4,200,551—Derbyshire (1980).

U.S. Pat. No. 3,928,657 and 3,897,852, both to Tieszen, lead to the use of high viscosity ($>10^{10}$ poise) and low viscosity ($10^4$ poise) PTFE along with polyphenylene sulfide such as polyphenylene sulfide (PPS) in coatings.

Melt viscosity of perfluoropolymers can be determined by known techniques such as that in U.S. Pat. No. 4,636,549—Gangal et al (1987). See col. 4, lines 25-63.

Coatings systems including intermediate and top coats useful with the present invention are described in various patents including:
U.S. Pat. No. 4,049,863—Vassiliou (1977);
U.S. Pat. No. 4,118,537—Vary and Vassiliou (1978);
U.S. Pat. No. 4,123,401—Berghmans and Vary (1978);
U.S. Pat. No. 4,252,859—Concannon and Vary (1981);
U.S. Pat. No. 4,351,882—Concannon (1982); all incorporated herein by reference.

SUMMARY OF THE INVENTION

The present invention, in certain of its embodiments, provides a coating system comprising a substrate with a multi-layer non-stick coating, comprising a primer, a topcoat, and up to one or more intermediate coats between the primer and the topcoat, wherein:

the substrate is free of contaminants that would prevent adhesion of the coating, the primer is applied to the substrate in the form of an aqueous dispersion comprising perfluorocarbon resin and at least one of polyamide imide and polyether sulfone resins wherein the perfluorocarbon resin comprises 50–90% by weight of a first resin of polytetrafluoroethylene having a melt viscosity of at least about $10^{10}$ poises plus 50–10% of a second resin of perfluorinated copolymer of perfluoro alkyl vinyl ether, preferably perfluoro propyl vinyl ether, and tetrafluoroethylene (PFA) having a melt viscosity in the range of $10^3$ to $10^5$ poises, and the topcoat and any intermediate coats comprise perfluorocarbon resin.

DETAILED DESCRIPTION

The present invention permits not only lower cost by avoiding the roughening of the substrate but also smoother coated surfaces which can be advantageous for release on cookware, and for the gliding effect on steam iron sole plates. Also it can allow elimination of costly polishing of coated copier roll surfaces and application of dispersion PTFE coatings by coil coating and roller coating techniques.

The adhesion of high melt viscosity fluoropolymer coatings to all types of metal substrates, particularly to smooth metal, can be significantly improved through chemically induced stratification or formation of a concentration gradient in the primer. Addition of perfluorocarbon polymer having a melt viscosity (MV) in the range of $10^3$–$10^8$ poise, to a primer system composed of PTFE (MV=$10^{11}$) and a polymeric binder such as polyamide-imide or polyether sulfone, imparts a synergistic effect in which the fluoropolymer stratifies away from the substrate interface allowing the polymeric binder to obtain a higher concentration and degree of cure at the substrate interface, resulting in improved adhesion. The required cure temperature to achieve this stratification can be modified by the choice of fluoropolymer.

With use of the coatings of the invention on smooth substrates, treated only by washing to remove grease and any other contaminants which might interfere with adhesion, coating systems of the invention give good food release and good performance in the usual durability tests such as the "tiger paw" abuse cooking tests involving a weighted holder with multiple ball point pen shafts rotating around the inside of a frying pan during cooking tests. The tests are generally described in U.S. Pat. No. 4,252,859, col. 2, lines 14–24.

Typical prior art preparation of surfaces to enhance adhesion of a release coating has involved etching or sand or grit blasting to develop a surface profile. The profile is measured in average microinches using a model RT 60 surface roughness tester made by Alpa Co. of Milan, Italy. The profile on typical rolled aluminum after washing to remove grease and contaminants is 16–24 microinches (0.41–0.61 microns). The profile on steel varies more widely but is typically less than 50 microinches (1.25 microns). On both steel and aluminum, before a release coating is applied the profile typically is increased to over 100 micro inches (2.5 microns), preferably for aluminum for some uses to 180–220 micro inches (4.6 to 5.6 microns). Thus, the present invention is particularly useful with steel or aluminum substrates having a profile of less than 100, preferably less than 50 micro inches (2.5, preferably less than 1.25 microns).

The primers of the invention can also be used on substrates roughened in various ways known in the art to make coating systems even better than without such undercoats. This can combine improved chemical adhesion with mechanical effects to produce products that may be superior.

In the following examples, the polyamide imide, colloidal silica and dispersions preferably are those of U.S. Pat. No. 4,049,863—Vassiliou (1977); the PFA is that generally disclosed in U.S. Pat. No. 4,253,859—Concannon and Vary (1981), but with a melt viscosity in the ranges of $2$–$4 \times 10^4$ poises, preferably in the form of a pulverized powder or a dried dispersion, either having an average particle size in the range of 20–25 μm; the ultramarine blue is that of U.S. Pat. No. 4,425,448—Concannon and Rummel (1984); and the polyether sulfone is that of U.S. Pat. Nos. 3,981,945 (1976), 4,090,993 (1978)—both Atwood et al, and 4,131,711 (1978)—Atwood.

The following examples and test data demonstrate this improved adhesion when used as a primer for fluoropolymer topcoats. The fluoropolymers are provided as 60% dispersions in water. As usual, solids contents of dispersions are given in the tables. The compositions were blended by techniques normal in the art and then applied to a smooth, degreased aluminum substrate by spraying.

EXAMPLE 1: PFA/PTFE

Multiple Coat System

TABLE 1

| 40% PFA/60% PTFE PRIMER | |
|---|---|
| WEIGHT PERCENT | |
| 0.008 | Zinc oxide |
| 0.050 | "Afflair 153" titania coated mica from EM Industries |
| 6.936 | Ultramarine Blue Pigment |
| 7.206 | "T-30" PTFE from Du Pont |
| 1.038 | "Ludox AM" colliodal silica from Du Pont |
| 4.930 | Type 340 PFA from Du Pont |
| 4.959 | Amoco AI-10 Polyamide imide resin from Amoco |
| 65.138 | Deionized Water |
| 0.471 | "Triton X-100" octyl phenol polyether alcohol non-ionic surfactant from Rohm and Haas |
| 0.700 | Diethylethanolamine |
| 1.399 | Triethylamine |
| 3.859 | Furfuryl Alcohol |
| 3.306 | N-Methyl Pyrolidone |
| TOTAL 100.000 | |

TABLE 2

| TOPCOAT | |
|---|---|
| WEIGHT PERCENT | |
| 0.790 | "Afflair 153" |
| 0.389 | Channel Black Pigment |
| 0.172 | Ultramarine Blue Pigment |
| 0.195 | Aluminum Silicate |
| 40.704 | "T-30" PTFE |
| 0.442 | Cerium Octoate |
| 0.054 | Sodium Polynaphthalene Sulfonate |
| 1.834 | Diethylene Glycol Monobutylether |
| 0.928 | Oleic acid |

TABLE 2-continued

| TOPCOAT | | |
|---|---|---|
| WEIGHT PERCENT | | |
| 33.772 | Deionized Water | |
| 3.480 | Triethanol Amine | |
| 2.246 | Hydrocarbon Solvent | |
| 2.914 | "Triton X-100" | |
| 12.080 | Acrylic Latex of 39 parts by weight terpolymer of methyl methacrylate/57 parts ethyl acrylate/4 parts methacrylic acid, dispersion at 40% solids in water, 0.2 µm average particle size | |
| TOTAL 100.00 | | |

Application

This system is comprised of a primer of PTFE, PFA and polyamide imide which is applied at 5-10 µm dry film thickness (DFT) to a metal surface which has been washed to remove oil and dirt contamination, air dried, and topcoated with a single (15-17.5 µm DFT) or multiple topcoats in thicknesses of 12.5-17.5 µm DFT each and having compositions similar to those shown in Table 2. The films are baked 10 minutes at 150° C. followed by a high temperature bake for a minimum of 3 minutes over 415° C.

Testing

After application of a single layer coating on smooth, degreased 12 gauge aluminum substrate, cured under varying conditions, the coated substrate was soaked in boiling water for 20 minutes. The coating is cut down to the substrate, then a person attempts to pull back the coating with his fingernail. In the following Table, P indicates that the coating did not come loose, F would indicate that it pulled back at least 1 cm.

TABLE 3

| Fingernail Adhesion on Smooth Aluminum Cure (Temp °C./Time - min) | |
|---|---|
| 416/3 | 427/5 |
| P | P |

Tests with a different PFA having a higher melt viscosity of $2-4 \times 10^5$ poises, led to failure of this coating.

When these coatings are applied as described to smooth degreased aluminum cookware they give acceptable crosshatch and fingernail adhesion test results and are better than a commercial 3-coat system applied to aluminum grit blasted to a profile of 180-220 microinches (4.6-5.5 microns) in terms of tiger paw testing.

A preferred topcoat is that of Example 1 of U.S. Pat. No. 4,118,537. Alternatively, the coats above the undercoat and primer (topcoat and optional intermediate coats) can be those of U.S. Pat. Nos. 4,252,854; 4,351,882; and 4,425,448, and combinations thereof.

I claim:

1. A coated substrate comprising a substrate with a multi-layer non-stick coating, comprising a primer, a topcoat, and up to one or more intermediate coats between the primer and the topcoat, wherein:

the substrate is free of contaminants that would prevent adhesion of the coating, the primer is applied to the substrate in the form of an aqueous dispersion comprising perfluorocarbon resin and at least one of polyamide imide and polyether sulfone resins wherein the perfluorocarbon resin comprises 50-90% by weight of a first resin of polytetrafluoroethylene having a melt viscosity of at least about $10^{10}$ poises plus 50-10% of a second resin of perfluorinated copolymer of perfluoro alkyl vinyl ether and tetrafluoroethylene having a melt viscosity in the range of $10^3$ to $10^5$ poises, and the topcoat and any intermediate coats comprise perfluorocarbon resin.

2. The coated substrate of claim 1 wherein the melt viscosity of said first resin is at least $10^{11}$ poises and the melt viscosity of said second resin is in the range of $10^4$-$10^5$ poises.

3. The coated substrate of claim 1 wherein the perfluoro alkyl vinyl ether is perfluoro propyl vinyl ether.

4. The coated substrate of claim 1 wherein the primer contains 3-5% colloidal silica, 1-4% surfactant, 15-30% polyamide imide, and 25-55% perfluoropolymer consisting of 60-85% polytetrafluoroethylene, with balance of the perfluoropolymer being the copolymer.

5. The coated substrate of claim 1 wherein, before application of the undercoat, the surface of the substrate has been treated to remove contaminants that would interfere with adhesion but has not been etched or mechanically roughened.

6. The coated substrate of claim 1 wherein the primer coating resulting from said aqueous dispersion is not uniform in composition throughout its thickness but has a lower concentration of polytetrafluoroethylene at the interface with the substrate than at the opposite interface.

7. The coated substrate of claim 1 wherein the substrate is metal selected from aluminum, stainless steel and carbon steel.

8. The coated substrate of claim 7 wherein the substrate before coating has a surface roughness profile less than 2.5 microns.

9. The coated substrate of claim 7 wherein the substrate before coating has a surface roughness profile less than 1.25 microns.

10. A process of making the coating substrate of claim 1 wherein the coatings are applied to the substrate without completely drying one coating before applying the next, and then the entire coating is cured by heating it at least 350° C.

* * * * *